(12) United States Patent
Harp

(10) Patent No.: US 10,348,500 B2
(45) Date of Patent: Jul. 9, 2019

(54) KEY MATERIAL MANAGEMENT

(71) Applicant: Adventium Enterprises, LLC, Minneapolis, MN (US)

(72) Inventor: Steven A. Harp, Coon Rapids, MN (US)

(73) Assignee: Adventium Enterprises, LLC, Minneapolis, MN (US)

( * ) Notice: Subject to any disclaimer, the term of this patent is extended or adjusted under 35 U.S.C. 154(b) by 262 days.

(21) Appl. No.: 15/147,319

(22) Filed: May 5, 2016

(65) Prior Publication Data

US 2017/0331627 A1 Nov. 16, 2017

(51) Int. Cl.
| | | |
|---|---|---|
| *H04L 9/08* | (2006.01) | |
| *H04L 29/06* | (2006.01) | |
| *H04L 9/32* | (2006.01) | |
| *H04L 9/14* | (2006.01) | |
| *G06F 9/455* | (2018.01) | |
| *G06F 21/31* | (2013.01) | |
| *G06F 21/60* | (2013.01) | |

(52) U.S. Cl.
CPC ........ *H04L 9/0894* (2013.01); *G06F 9/45558* (2013.01); *G06F 21/31* (2013.01); *G06F 21/60* (2013.01); *H04L 9/14* (2013.01); *H04L 9/3242* (2013.01); *H04L 9/3247* (2013.01); *H04L 63/061* (2013.01); *H04L 63/20* (2013.01); *G06F 2009/45587* (2013.01)

(58) Field of Classification Search
CPC ....... H04L 9/0894; H04L 9/14; H04L 9/3242; H04L 9/3247; H04L 63/061; H04L 63/083; H04L 63/20; G06F 21/72
See application file for complete search history.

(56) References Cited

U.S. PATENT DOCUMENTS

| | | | | |
|---|---|---|---|---|
| 7,424,610 B2* | 9/2008 | Ranganathan | ........ | G06F 21/305 713/164 |
| 8,694,781 B1* | 4/2014 | Griffin | ................ | G06F 9/45558 713/168 |
| 9,559,842 B2* | 1/2017 | Baldwin | .................. | H04L 9/083 |
| 9,690,947 B2* | 6/2017 | Bacher | ................... | G06F 21/602 |
| 9,804,866 B2* | 10/2017 | Halls | ................... | G06F 9/45533 |
| 9,836,308 B2* | 12/2017 | Boenisch | .............. | G06F 9/4408 |
| 2009/0113110 A1* | 4/2009 | Chen | ..................... | G06F 9/4426 711/6 |
| 2009/0125974 A1* | 5/2009 | Zhang | ..................... | G06F 21/53 726/1 |
| 2010/0058340 A1* | 3/2010 | Kamada | .............. | G06F 21/6218 718/1 |

(Continued)

OTHER PUBLICATIONS

Hirano et al., "Portable ID Management Framework for Security Enhancement of Virtual Machine Monitors", (2009). pp. 477-488. http://www.intechopen.com/books/engineering-the-computer-science-and-it/portable-id-managementframework-for-security-enhancement-of-virtual-machine-monitors (Year: 2009).*

*Primary Examiner* — Hee K Song
(74) *Attorney, Agent, or Firm* — Brooks, Cameron & Huebsch, PLLC

(57) ABSTRACT

Methods and systems for key material management are disclosed. One system can include a virtual machine monitor (VMM) running on a host device and a number of virtual machines (VMs) running on the VMM, wherein the VMM is configured to perform key management to provide access by the number of VMs to key material required for the VMs to perform key management operations.

19 Claims, 7 Drawing Sheets

(56) References Cited

U.S. PATENT DOCUMENTS

| | | | |
|---|---|---|---|
| 2012/0151209 A1* | 6/2012 | Visnyak | H04L 9/3234 713/166 |
| 2013/0067470 A1* | 3/2013 | Chen | G06F 11/3093 718/1 |
| 2014/0208123 A1* | 7/2014 | Roth | G06F 21/72 713/189 |
| 2014/0258716 A1* | 9/2014 | MacMillan | G06F 21/53 713/164 |
| 2015/0248357 A1* | 9/2015 | Kaplan | G06F 12/1408 713/193 |
| 2015/0358294 A1* | 12/2015 | Kancharla | G06F 21/335 713/164 |
| 2015/0358312 A1* | 12/2015 | Kancharla | G06F 21/335 713/156 |
| 2016/0092243 A1* | 3/2016 | Boenisch | G06F 9/4408 713/2 |
| 2016/0132349 A1* | 5/2016 | Bacher | G06F 9/45558 718/1 |
| 2017/0048249 A1* | 2/2017 | Berrange | H04L 63/102 |

* cited by examiner

KEY MATERIAL MANAGEMENT

GOVERNMENT RIGHTS

The subject matter of this disclosure was made with government support under Contract Number FA8750-10-D-0197 0009 awarded by the Air Force Research Laboratory. Accordingly, the U.S. Government has certain rights to subject matter disclosed herein.

BACKGROUND

A virtual machine (VM) that can be used by a user can have a number of security issues. For example, a VM can be exposed to hacking among other security threats. In previous approaches where there are resources that are shared between a requesting VM and a privileged VM, there may be a risk of a requesting VM obtaining key material to which the requesting VM does not have permission.

Key material can be used as a security measure in an electronic device. Key material can be a piece of information, such as a public key, a private key, or a certificate, that determines a functional output of a cryptographic algorithm. For example, key material can specify a transformation of plaintext into ciphertext, and vice versa. Key material can specify transformations in cryptographic algorithms, such as digital signature schemes and message authentication codes. For example, key material can be used to restrict access to a particular electronic device, a storage device or a partition of the storage device, a particular file, etc. Key material can also be used to restrict a number of key management operations. For example, a user may only have permission to perform particular key management operations, such as generating new key material or deleting key material.

DETAILED DESCRIPTION

Figure 1A:
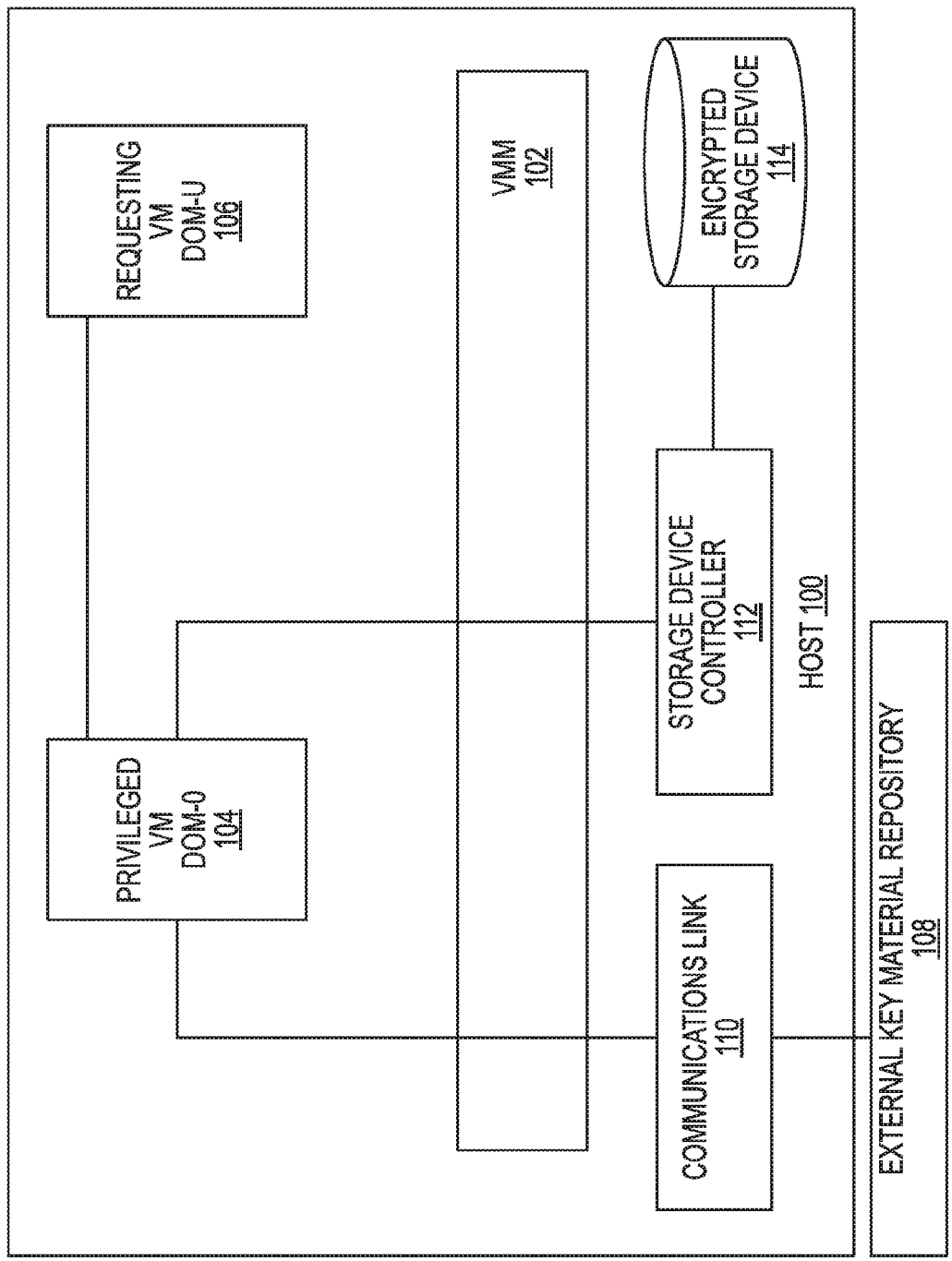
FIG. 1A illustrates a previous approach for providing key material management.

The present disclosure includes methods and systems for providing key material management. An embodiment can be a system, comprising a virtual machine monitor (VMM) running on a host device and a number of virtual machines (VMs) running on the VMM. The VMM can be configured to perform a number of key material management operations to provide access by the number of VMs to key material required for the VMs to perform key management operations. A number of embodiments can include providing a VMM that can include one or more customized functions to provide access to key material. A number of embodiments can also include providing key material management for an external key material repository, or a hardware device local to a host device, storing key material.

A number of embodiments can provide benefits such as enhanced security relative to previous VM environments. For example, a number of embodiments can provide benefits such as enabling secure operational access to a dedicated non-volatile memory component for key material storage and retrieval within a virtualization platform through a shared system communication mechanism while also providing strict policy-based access control. Access to key material can thereby be strictly controlled without relying on another, possibly untrusted, VM(s) that can be running on the virtualized platform, such as a control VM or a key management VM. Thus, a VM requesting a key material can be isolated from a privileged VM, which can reduce the risk of unauthorized disclosure of key material.

In the following detailed description of the present disclosure, reference is made to the accompanying drawings that form a part hereof, and in which are shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 204 may reference element "04" in FIG. 2, and a similar element may be referenced as 304 in FIG. 3. As will be appreciated, elements shown in the various embodiments herein can be added, exchanged, and/or or eliminated so as to provide a number of additional embodiments of the present disclosure. In addition, the proportion and the relative scale of the elements provided in the figures are intended to illustrate the embodiments of the present invention, and should not be taken in a limiting sense. Also, as used herein "a number of" something can refer to one or more of such things.

Various embodiments of the present disclosure can be performed by execution of computer-readable instructions (CRI), in the form of software and/or firmware, application modules, and the like, executable and/or resident on the tools, systems, and devices shown herein or otherwise. As used herein, a virtual machine monitor (e.g., hypervisor) refers to CRI that provide virtualization support for a number of VMs. A VM can operate as a standalone computing device (e.g., with an operating system, applications, etc.) except that it runs in a virtualized environment provided by the VMM. The VMM may require a privileged VM to emulate hardware and firmware calls for the unprivileged VMs. The privileged VM can provide interfaces to virtual hardware devices that the VMM can export to unprivileged VMs. The privileged VM can translate operations on these virtual hardware devices to operations on shared physical hardware devices. This privileged VM can have a "privileged" view of the internal operation of the unprivileged VMs.

A VM can have virtual system hardware and guest CRI. The virtual system hardware can include at least one virtual central processing unit (CPU), virtual memory, and a number of virtual storage devices. The guest VM can include a guest Operating System (OS) and a number of drivers as needed for the various virtual storage devices. As used herein, the term guest can make reference to components that are part of a VM. For example, a host platform (e.g., a computing device) can include an OS that can be referred to as a host OS and a VM can include an OS that can be referred to as a guest OS.

A VM can operate on a computing device under its own context, which can be provided by a VMM. A context of a VM can include the state of virtual address space, as well as a set of registers, for example. A context of a VM can also include the state of a number of virtual storage devices.

A number of VMs can operate on a computing device while being isolated from each other. The number of VMs can share resources from a computing device even though a number of VMs can remain isolated from each other. For example, executable files can be accessed by a guest OS from a virtual disk and/or virtual memory which can be mapped to portions of the physical storage device (e.g., host disk) or physical memory (e.g., host memory), respectively. The allocation of physical disk space and/or physical memory can be determined by the VMM.

FIG. 1A illustrates a previous approach for providing key material management. FIG. 1A illustrates the VMs 104 and 106 running on a VMM 102. The VMM 102 may be run on a host device 100. The VMM may run at a highest hardware privilege level of a processor on the host device 100. In this example, the VM 104 is a privileged VM 104 and the VM 106 is a requesting VM 106. The privileged VM 104 may run an operating system software and application software for mediating access of VMs to physical resources of the host device 100, and supervisory control of VMM 102. In some previous systems in order for a requesting VM 106 to access an encrypted storage device 114, the requesting VM 106 must forward its communications to the encrypted storage device 102 through the privileged VM 104. The privileged VM 104 can be distinguished from other VMs running on the VMM 102 by one or more privileges of the privileged VM 104, which may include the privilege to start or stop another VM running on the VMM 102. Although FIG. 1A shows only one requesting VM 106, there may be any number of requesting VMs 106 running on the VMM 102. The requesting VM 106 may require a particular set of permissions and corresponding key material. The privileged VM 106 may perform sensitive data operations and may be coupled to and have access to a storage device controller 112.

The storage device controller 112 may be an electronic device that enables as a host device 100 to communicate with the encrypted storage device 114. The storage device controller 112 may provide an interface between the encrypted storage device 114, (e.g., a magnetic disk or solid state drive) and the rest of the system. The storage device controller 112 may be coupled to the encrypted storage device 114. A communications link 110 may be coupled to an external key material repository 108, for example on a network, storing key material. The communications link 110 may be an electronic device that couples the host device to a computer other than the host device 100, such as a network or data communications interface. The exclusive control by the privileged VM 104 and the storage device controller 112 and the communications link 110 may be granted by the VMM 102. When the requesting VM 106 requests access to the encrypted storage device 114, the request may be sent to the privileged VM 104. The privileged VM 104 may then retrieve the corresponding key material from the external key material repository 108 via the network controller 110. The privileged VM 104 may then access the encrypted storage device 114 and pass data between the encrypted storage device 114 and the requesting VM 106.

Figure 1B:
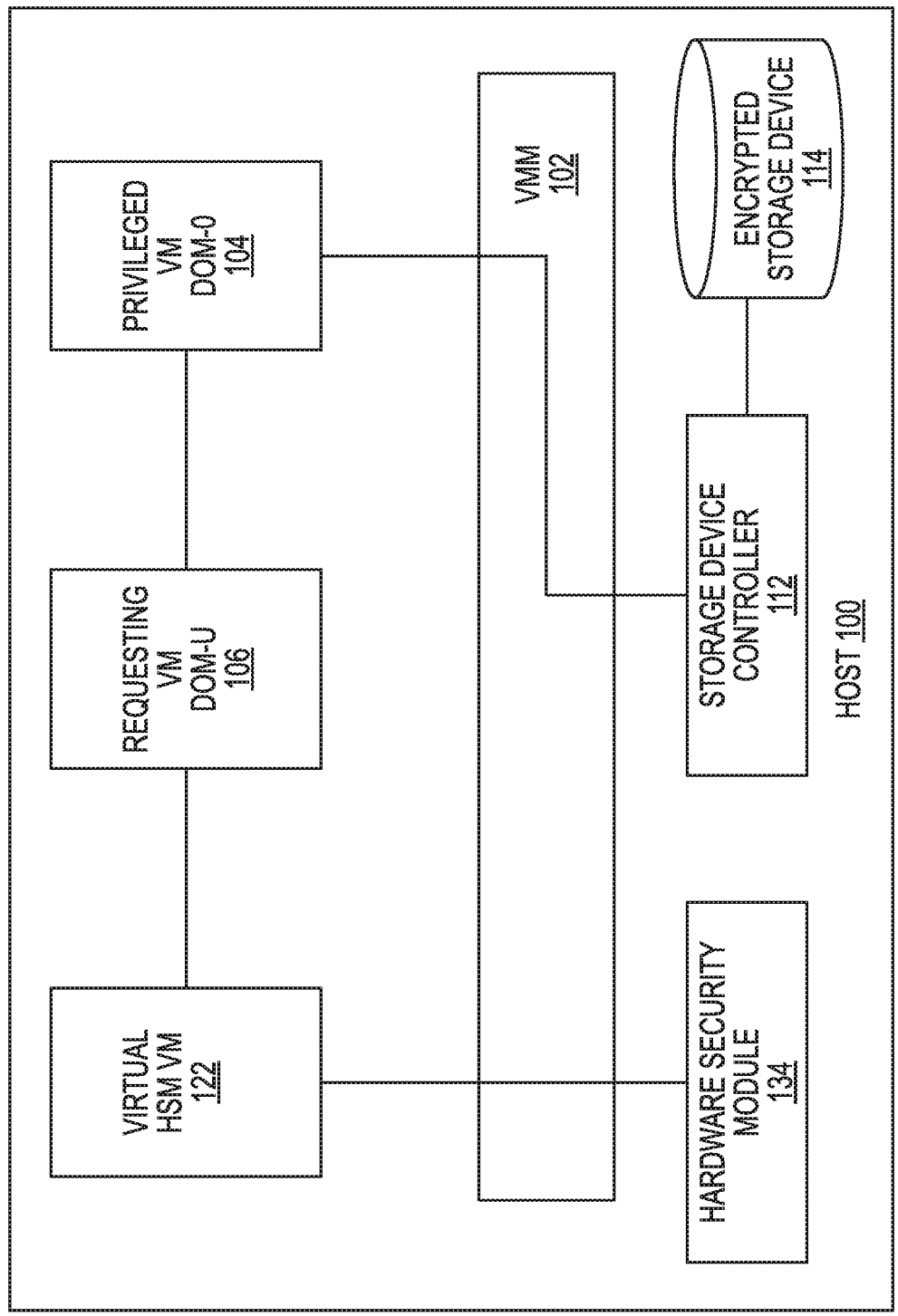
FIG. 1B illustrates a previous approach for providing key material management.

FIG. 1B illustrates a previous approach for providing key material management. FIG. 1B illustrates the VMs 104, 106, and 122 running on a VMM 102. The VMM 102 may be run on a host device 100. The VMM may run at the highest hardware privilege level of the processor on host device 100. In this example, the VM 104 is a privileged VM 104, the VM 106 is a requesting VM 106, and the VM 122 is a virtual hardware security module (HSM) VM that provides access to the HSM 134 that may be internal to the host device 100 and may store key material. The virtual HSM VM can emulate a HSM such as the HSM 134. The privileged VM 104 is a VM that is distinguished from other VMs running on the VMM 102 by the permissions of the privileged VM 104. The privileged VM 104 may run an operating system software and application software for mediating access of VMs to physical resources of the host device 100, and to provide supervisory control of the VMM 102. In some previous systems in order for a requesting VM 106 to access an encrypted storage device 114, the requesting VM 106 must forward communications from the requesting VM 106 to the encrypted storage device 114 through the privileged VM 104. In this previous approach, the key material is stored in the HSM 134, and access to the key material must be enabled through the virtual HSM VM 122. The requesting VM 106 may communicate with the Virtual HSM VM 122. Although FIG. 1B shows only one requesting VM 106, there may be any number of requesting VMs 106. The requesting VM 106 may have a particular set of permissions and corresponding key material. The privileged VM 106 may perform sensitive data operations and may be coupled to and have access to a storage device controller 112.

In FIG. 1B, the storage device controller 112 may be an electronic device that enables as a host device 100 to communicate with the encrypted storage device 114. The storage device controller 112 may provide an interface between the encrypted storage device 114, (e.g., a magnetic disk or solid state drive) and the rest of the system. The storage device controller 112 may be coupled to the encrypted storage device 114. The exclusive control by the privileged VM 104 of the storage device controller 112 may be granted by the VMM 102. When the requesting VM 106 requests access to the encrypted storage device 114, the request may be sent to the privileged VM 104. The requesting VM 106 may retrieve the corresponding key material from the HSM 134 via the virtual HSM VM 122. The requesting VM 106 may then use the key material to decrypt or encrypt data stored the encrypted storage device 114.

As illustrated by FIGS. 1A and 1B, previous approaches for key material management may use shared resources. Due to the reliance of the requesting VM 106 on the services of one or more additional VMs running on the VMM 102 (e.g., the privileged VM 104 or the virtual HSM VM 122) for access to key material, there is an increased risk of unauthorized disclosure of key material. It can be beneficial to isolate the requesting VM 106 from one or more additional VMs running on the VMM 102, such as other VMs that are members of various security domains, thereby minimizing the number of shared resources.

Figure 2:
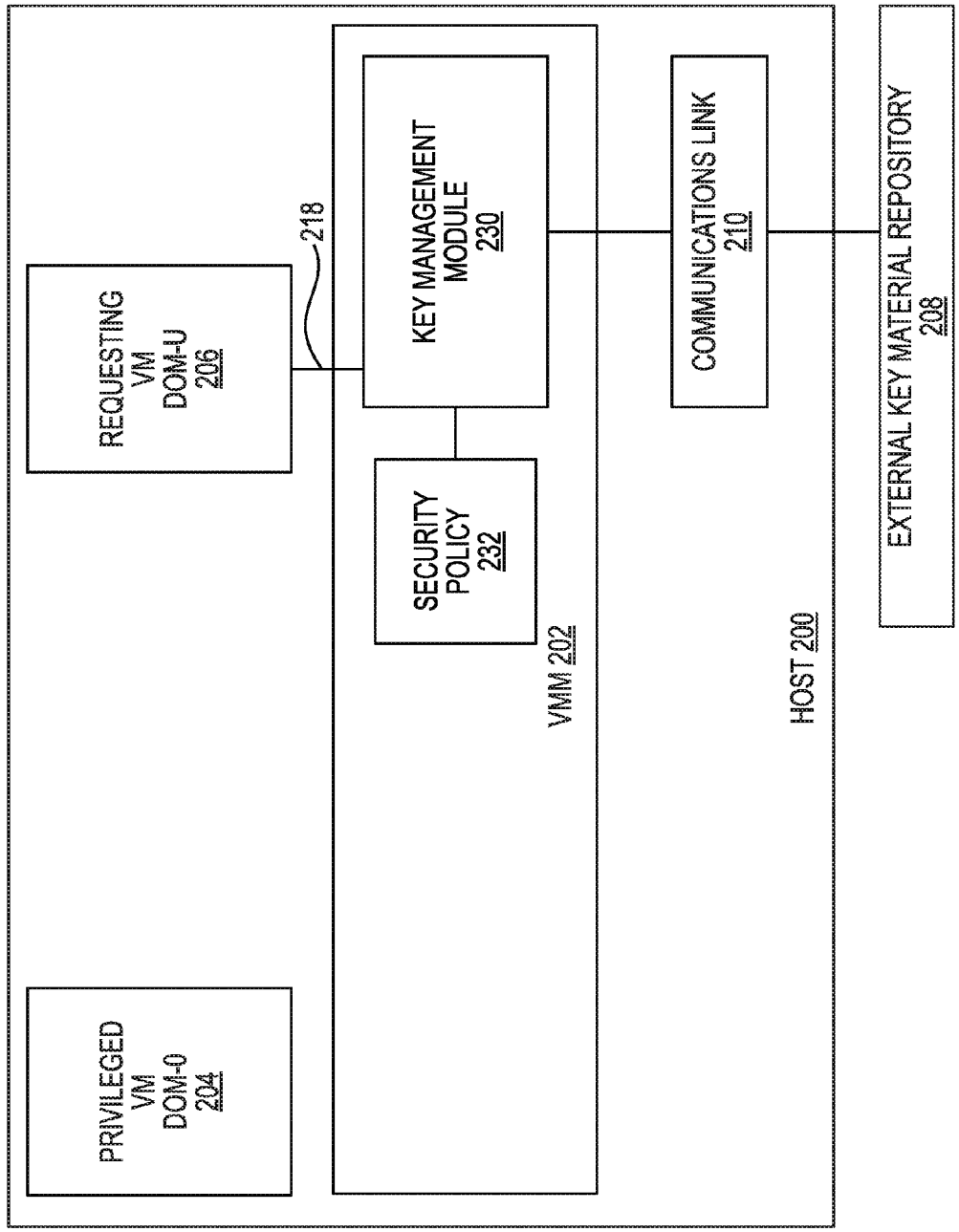
FIG. 2 illustrates a system for providing key material management using a key material repository external to a host device in accordance with a number of embodiments of the present disclosure.

FIG. 2 illustrates a system for providing key material management using a key material repository external to a host device 200 in accordance with a number of embodiments of the present disclosure. FIG. 2 illustrates the VMs 204 and 206 running on a VMM 202. The VMM 202 can be run on a host device 200. In this example, the VM 204 is a privileged VM 204 and the VM 206 is a requesting VM 206. The privileged VM 204 is distinguished from other VMs running on the VMM 202 by the permissions of the privileged VM 204. The requesting VM 206 can require key material to access any kind of encrypted information within the system (e.g., encrypted data stored on an encrypted storage device).

In contrast to the previous approach illustrated in FIGS. 1A and 1B, the privileged VM 204 can be isolated from the other components of the system, such as the requesting VM 206 and the external key material repository 208. Thus, other VMs running on the VMM 202 (e.g., the privileged VM 204) may not have unrestricted access to key material or key management operations within the system.

The requesting VM 206, which can request key material from the external key material repository 208 storing key material. The external key material repository 208 can store any number of key material associated with any number of security domains. The external key material repository 208 can be a key server external to the host device, such as on a dedicated cable or network. The external key material repository 208 may communicate with the requesting VM 206 via a protocol such as a key management interoperability protocol (KMIP).

The VMM 202 may incorporate a key management module 230 to support a key management secure programming interface between a VM (e.g., the requesting VM 206) and the VMM 202, which, for example, can be used by the VM to request access to key material that can be required to access a corresponding encrypted device. The key management secure programming interface 218 can be a key management hypercall. As used herein, "hypercall" refers to a secure transition of control from a VM to a VMM hosting the VM to request a VMM service. Examples of a VMM service can be creating a new VM or allotting additional memory to a VM. For example, a hypercall is similar to a system call. Where a system call can be used by applications running on a computer to request a service from an OS kernel, a hypercall can be used by a VM to request a VMM service from a VMM.

The key management operations that can be performed with the system illustrated in FIG. 2 can include, but are not limited to, retrieving key material, generating new key material, deleting key material, applying a digital signature, encrypting data, decrypting data, and verifying a digital signature.

A communications link 210 can be coupled to the key management module 230 and can provide the key management module 230 with access to the external key material repository 208. The communications link 210 can support a direct low bandwidth communications protocol, such as a serial communications interface. A security policy 232 can be used to selectively authorize access by the requesting VM 206 to the key management operations. The security policy can be a set of rules that define permissions to a number of key management operations or key material. The security policy 232 can be a mandatory access control (MAC) mechanism, within the VMM 202, that may not be subject to a discretionary change during operation of the VMM 202.

As illustrated in FIG. 2, the privileged VM 204 can be isolated from the requesting VM 206. In previous approaches, such as those illustrated in FIGS. 1A and 1B, a VMM (e.g., the VMM 102) does not participate in key material management, which may be delegated to other VMs. In contrast, a number of embodiments in accordance with the present disclosure utilize a VMM (e.g., the VMM 202) to enforce a security policy 232 to ensure that authorized VMs are given access to key material. Instead of relying on the permissions of the privileged VM 204, the key management module 230 can be used by the requesting VM 206 to request access to key material that can be stored in the external key material repository 208. The VMM 202 can implement the security policy 232, within the VMM 202, to determine whether the requesting VM 206 is authorized to perform a key management operation corresponding to the requested key material. The VMM 202 can also implement the security policy 232 to control the key management operations that other VMs running on the VMM 202 (e.g., the privileged VM 204) can perform. For example, if the VMM 202 determines that the requesting VM 206 is authorized to perform a key management operation corresponding to the requested key material, then the key management module 230 can be permitted by the security policy 232 to release the requested key material to the requesting VM 206.

Although FIG. 2 only shows the privileged VM 204 and the requesting VM 206, embodiments can include additional VMs running on the VMM 202. The embodiment illustrated in FIG. 2 can be useful in larger applications, for example, where there is more than one host device 200. The key material can be stored at a separate physical location, such as the external key material repository 208, which can serve multiple host devices.

The number of VMs can be partitioned into a number of different subsets designating security domains, which can be conventionally referred to by a color name. For example, the requesting VM 206 can be a member of a "blue" security domain and another VM (not shown) can be a member of a "red" security domain, which may be distinct from the "blue" domain. The key management operations and key material required for them that the number of VMs can perform can be dependent on the VM's membership in a particular security domain. The security domain may be assigned to each VM upon creation of each VM. For example, members of the "blue" security domain may only have permission to access "blue" key material, which can be the key material required by the members of the "blue" security domain. Similarly, members of the "red" security domain may only have permission to access "red" key materials, which can be the key materials required by the members of the "red" security domain. The security domain can differentially restrict the allowed key management operations. For example, the "blue" domain can be permitted to perform a particular key management operation, (e.g., retrieving key material), but may not be permitted to perform another key management operation (e.g., creating new key material) whereas the "red" security domain may be permitted to perform both key management operations.

Figure 3:
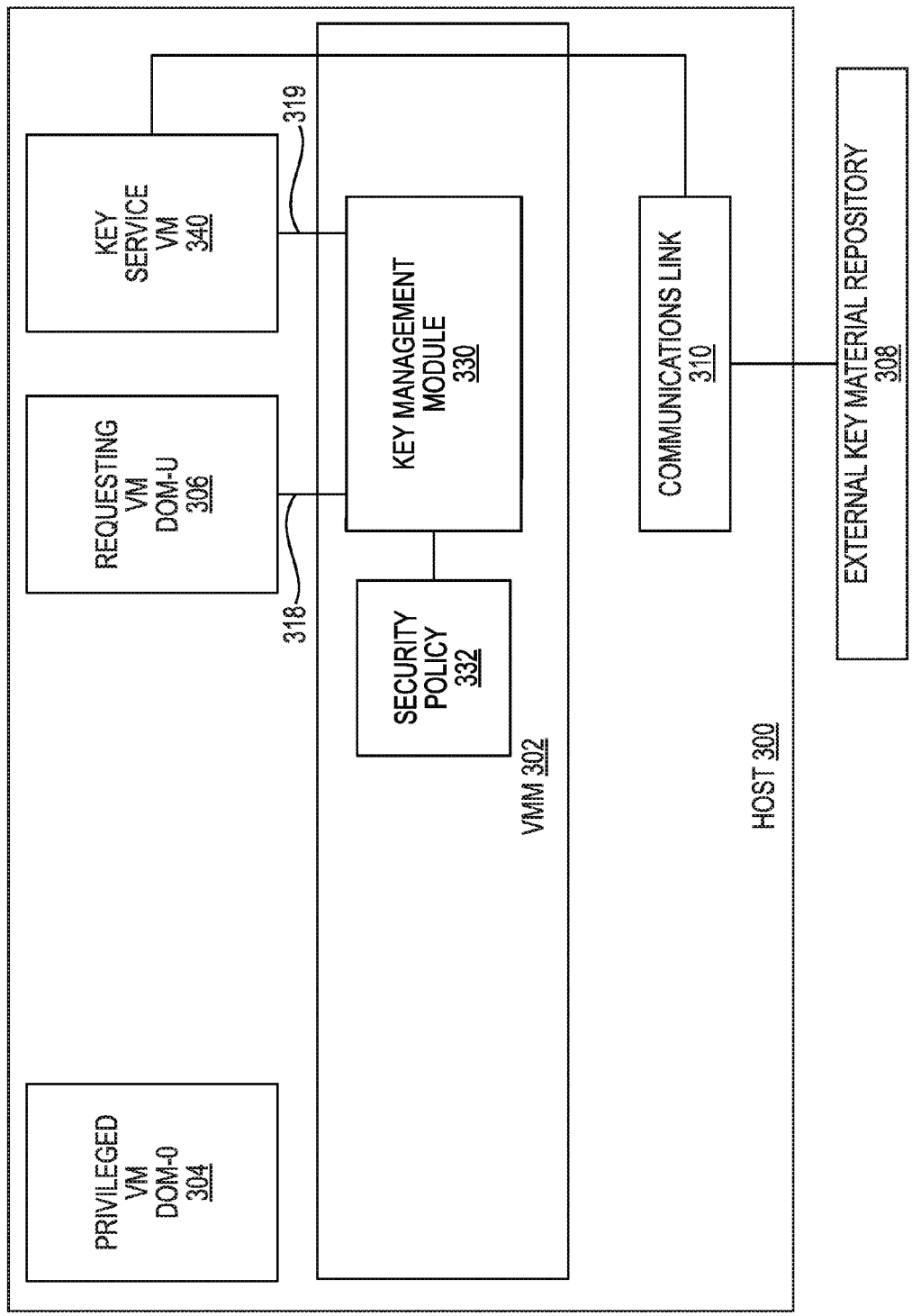
FIG. 3 illustrates a system for providing key material management using a key material repository external to a host device in accordance with a number of embodiments of the present disclosure.

FIG. 3 illustrates a system for providing key material management using a key material repository external to a host device 300 in accordance with a number of embodiments of the present disclosure. The host device 300, the requesting VM 306, the privileged VM 304, the VMM 302, the communications link 310, the security policy 332, the key management module 330, and the external key material repository 308 can be analogous to the host device 200, the requesting VM 206, the privileged VM 204, the VMM 202, the communications link 210, the security policy 232, the key management module 230, and the external key material repository 208 illustrated in FIG. 2, respectively.

FIG. 3 illustrates an embodiment where access to an external key material repository 308 is mediated by a key service VM 340. The key service VM 340 can be run on the VMM 302. The key service VM 340 is distinguished from other VMs running on the VMM 302 by the privileged communication that the key service VM 340 can have with the VMM 302. The key service VM 340 can access the external key material repository 308 via the communications link 310. This is in contrast to the system illustrated in FIG. 2 where the key management module 230 can directly access the external key material repository 208. The communications link 310 can provide an interface between the external key material repository 308 and the rest of the system. The communications between the key service VM 340 and the communications link 310 can be authorized by the VMM 302. After performing a requested key management operation, the key service VM can forward a result of the requested key management operation to the key management module 330 of the VMM 302. A result of a requested key management operation can include, but is not limited to, forwarding requested key material, which can be acquired from the external key material repository 308, to the key management module 330 or receiving an error message indicating that the requesting VM 306 does not have the necessary privileges for the requested key management operation. The key service VM 340 can use a secure programming interface 318 to forward the result of the requested key management operation.

The requesting VM 306 can request a key management operation be performed via a secure programming interface 318. The secure programming interface 318 can differ from the secure programming interface 319 in that a different hypercall can be used by the requesting VM 306 than a hypercall used by the key service VM. The VMM 302 can implement a security policy 332 within the VMM 302 to determine whether the requesting VM 306 is authorized to perform the key management operation corresponding to the requested key material. The VMM 302 can also implement the security policy 332 to control the key management operations that other VMs running on the VMM 302 (e.g., the privileged VM 304) can perform. The security policy 332 can be a mandatory access control (MAC) mechanism within the VMM 302. If the VMM 302 determines that the requesting VM 306 is authorized to perform a key management operation corresponding to the requested key material, then the key management service VM 340, via the key management module 330, can be enabled by the security policy 332 to perform the corresponding key management operation on behalf of the requesting VM 306. Although FIG. 3 only shows the privileged VM 304, the requesting VM 306, and the key service VM 340, embodiments can include additional VMs running on the VMM 302.

Figure 4:
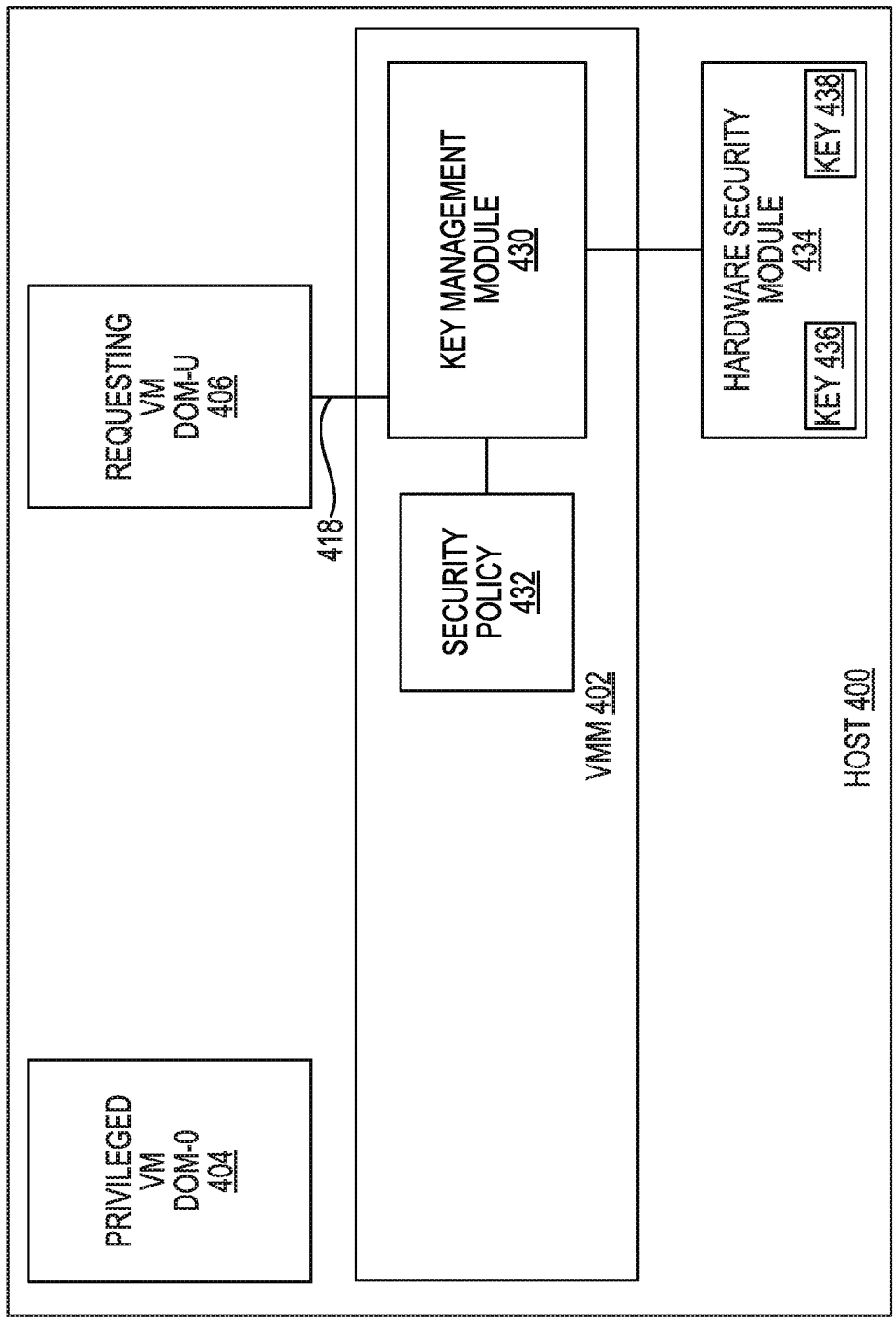
FIG. 4 illustrates a system for providing key material management using a key material repository internal to a host device in accordance with a number of embodiments of the present disclosure.

FIG. 4 illustrates a system for providing key material management using a key material repository internal to a host device 400 in accordance with a number of embodiments of the present disclosure. The host device 400, the requesting VM 406, the privileged VM 404, the VMM 402, the security policy 432, and the key management module 430 can be analogous to the host device 200, the requesting VM 206, the privileged VM 204, the VMM 202, the security policy 232, and the key management module 230 illustrated in FIG. 2, respectively.

The system illustrated in FIG. 4 differs from the system illustrated in FIG. 2 in that a key material repository is internal to the host device 400. The key material repository internal to the host device 400 can be a hardware device local to the host device 400 such as a hardware security module (HSM) 434. The HSM 434 can be a trusted platform module (TPM). The key material repository internal to the host device 400 can also be a secure cryptographic processor with private storage. The HSM 434 can store any number of key material associated with any number of security domains. For example, a first key material 436 can be associated with a first security domain and a second key material 438 can be associated with a second security domain. Although FIG. 4 shows a first key material 436 and a second key material 438 being stored on the HSM 434, embodiments can include additional key material being stored on the HSM 434.

In contrast to the previous approach illustrated in FIGS. 1A and 1B, the privileged VM 404 is isolated from the other components of the system, such as the requesting VM 406 and the HSM 434. Thus, the privileged VM 404 does not have access to key management operations within the system. Instead of relying on the permissions of the privileged VM 404, a key management module 430 can be used by the requesting VM 406 to request key material, such as the first key material 436. The VMM 402 can implement a security policy 432, within the VMM 402, to determine whether the requesting VM 406 is authorized to perform a key management operation corresponding to the first key material 436. The VMM 402 can also implement the security policy 432 to control the key management operations that other VMs running on the VMM 402 (e.g., the privileged VM 404) can perform. The security policy 432 can be a MAC mechanism within the VMM 402. If the VMM 402 determines that the requesting VM 406 is authorized to perform a key management operation corresponding to the first key material 436, then the HSM 434 can be notified to execute the corresponding key management operation on behalf of the requesting VM 406.

Although FIG. 4 only shows the privileged VM 404 and the requesting VM 406, embodiments can include additional VMs running on the VMM 402. The embodiment illustrated in FIG. 4 can be useful in smaller applications. For example, where there is a single host and all key materials are stored on a key material repository internal to the host device 400, such as the HSM 434.

The number of VMs can be partitioned into a number of different subsets designating security domains, which can be conventionally referred to by a color name. For example, the requesting VM 406 can be a member of a "blue" security domain and another VM (not shown) can be a member of a "red" security domain, which may be distinct from the "blue" domain. The first key material 436 can be "blue" key material associated with the "blue" security domain and the second key material 438 can be "red" key material associated with the "red" security domain. The key management operations and key material required for them that the number of VMs can perform can be dependent on the VM's membership in a particular security domain. The security domain may be assigned to each VM upon creation of each VM. For example, members of the "blue" security domain may only have permission to access "blue" key material, which can be the key material required by the members of the "blue" security domain. Similarly, members of the "red" security domain may only have permission to access "red" key materials, which can be the key materials required by the members of the "red" security domain. The security domain can differentially restrict the allowed key management operations. For example, the "blue" domain can be permitted to perform a particular key management operation, (e.g., retrieving key material), but may not be perform another key management operation (e.g., creating new key material) whereas the "red" security domain may be permitted both key management operations.

Figure 5:
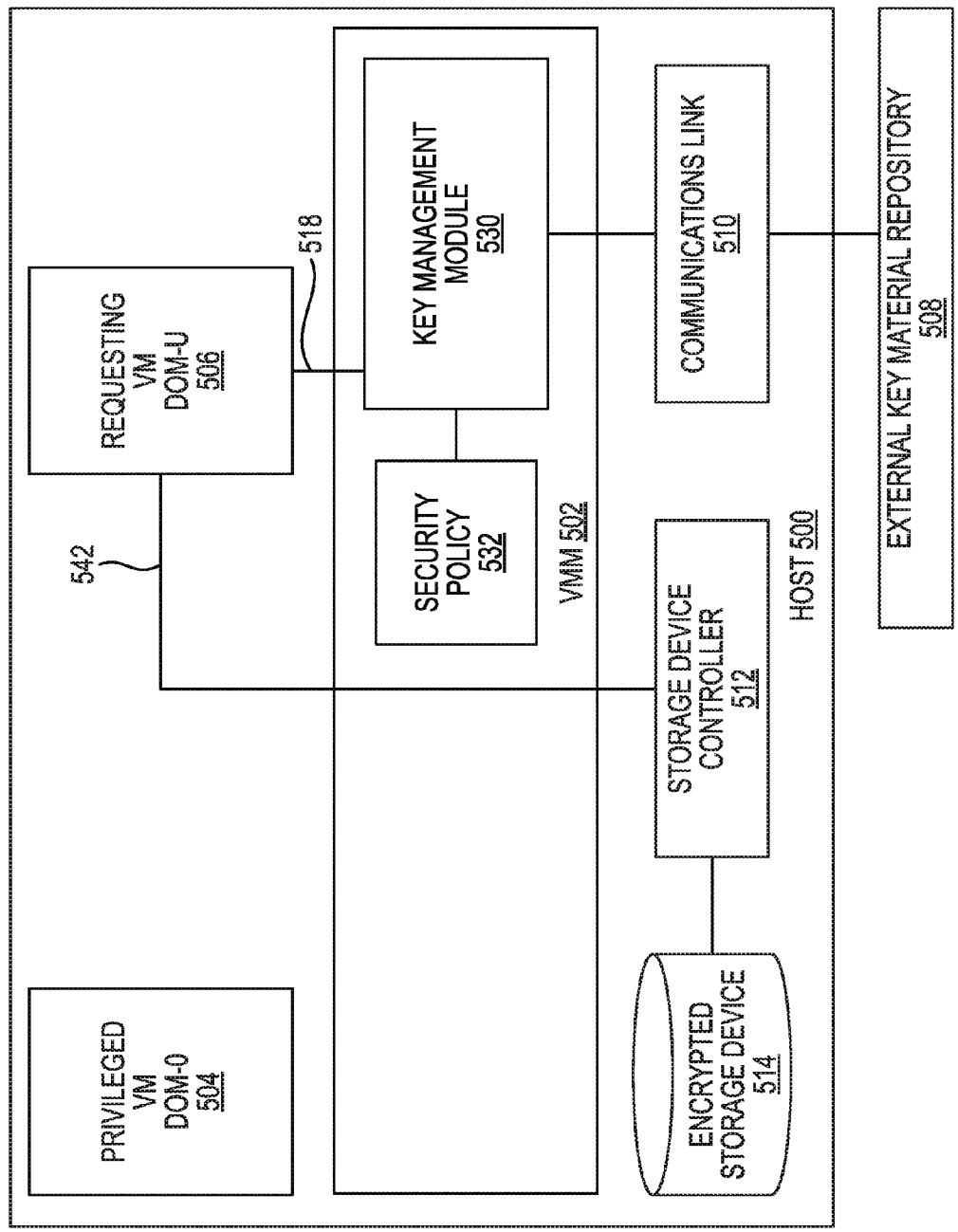
FIG. 5 illustrates a system for providing key material management using a key material repository external to a host device in accordance with a number of embodiments of the present disclosure.

FIG. 5 illustrates a system for providing key material management using a key material repository external to a host device in accordance with a number of embodiments of the present disclosure. The host device 500, the requesting VM 506, the privileged VM 504, the VMM 502, the communications link 510, the security policy 532, the key management module 530, and the external key material repository 508 can be analogous to the host device 200, the requesting VM 206, the privileged VM 204, the VMM 202, the communications link 210, the security policy 232, the key management module 230, and the external key material repository 208 illustrated in FIG. 2, respectively.

The system illustrated in FIG. 5 differs from the system illustrated in FIG. 2 in that FIG. 5 includes an encrypted storage device 514. In addition, a storage device controller 512 is coupled to the encrypted storage device 514. Although FIG. 5 shows the encrypted storage device 514 being internal to the host device 500, the encrypted storage device 514 can be external to the host device 500, for example, an encrypted drive on an external storage server. The requesting VM 506 can be granted, by the VMM 502, exclusive use of the storage device controller 512 as illustrated by the line 542. The requesting VM 506 can use a secure programming interface 518 to request key material from the external key material repository 508.

The VMM 502 can implement the security policy 532, within the VMM 502, to determine whether the requesting VM 506 is authorized to perform a key management operation corresponding to the requested key material stored on the external key material repository 508. The VMM 502 can also implement the security policy 532 to control the key management operations that other VMs running on the VMM 502 (e.g., the privileged VM 504) can perform. If the VMM 502 determines that the requesting VM 506 is authorized to perform a key management operation corresponding to the requested key material, then the key management module 530 can be permitted by the security policy 532, via the communications link 510, to release the requested key material from the external key material repository 508 to the requesting VM 506. The requesting VM 506 can use the requested key material to encrypt and decrypt data stored on the encrypted storage device 514. Requests for the same key material from other VMs running on the VMM 502 (e.g., the privileged VM 504) can be denied by the security policy 532. Similarly, requests from the requesting VM 506 for other key material stored on the external key material repository 508 can be denied by the security policy 532.

Although FIG. 5 shows key material for use with an encrypted storage device 514 being stored on an external key material repository 508, embodiments in accordance with the present disclosure are not so limited. For example, key material for use with an encrypted storage device 514 can be stored on a HSM (e.g., the HSM 434 as illustrated in FIG. 4). The system can include a different device (not shown), in addition to the encrypted storage device 514, coupled to the host device 500 and configured to perform a key management operation. For example, the different device can be another encrypted storage device or an encrypted external network (e.g., the encrypted external network 646 illustrated in FIG. 6). Although FIG. 5 only shows the privileged VM 504 and the requesting VM 506, embodiments can include additional VMs running on the VMM 502.

Figure 6:
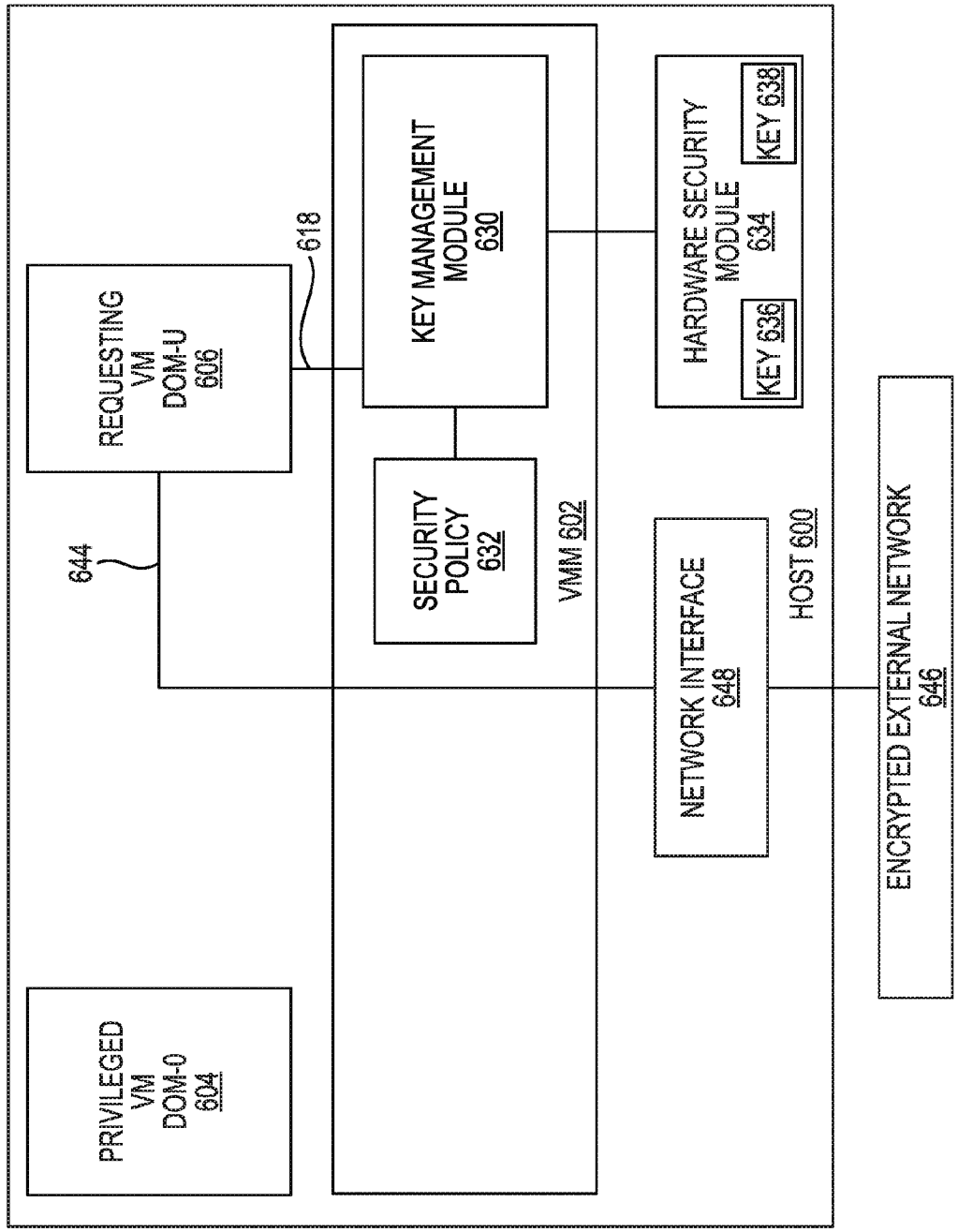
FIG. 6 illustrates a system for providing key material management using a key material repository internal to a host device in accordance with a number of embodiments of the present disclosure.

FIG. 6 illustrates a system for providing key material management using a key material repository internal to a host device in accordance with a number of embodiments of the present disclosure. The host device 600, the requesting VM 606, the privileged VM 604, the VMM 602, the security policy 632, the key management module 630, the HSM 634, the first key material 636, and the second key material 638 can be analogous to the host device 400, the requesting VM 406, the privileged VM 404, the VMM 402, the security policy 432, the key management module 430, the HSM 434, the first key material 436, and the second key material 438 illustrated in FIG. 4, respectively.

The system illustrated in FIG. 6 differs from the system illustrated in FIG. 5 in that the encrypted storage device 514 is replaced with an encrypted external network 646. In addition, a network interface device 648 is coupled to the encrypted external network 646. The network interface device 648 can provide an interface between the encrypted external network 646 and the rest of the system. The VMM 602 can also implement the security policy 632 to control the key management operations that other VMs running on the VMM 602 (e.g., the privileged VM 604) can perform. The security policy 632 can be a MAC mechanism within the VMM 602. The requesting VM 606 can be granted, by the VMM 602, exclusive use of the network interface device 648 as illustrated by the line 644. The encrypted network 646 can transmit encrypted traffic. The requesting VM 606 can use a secure programming interface 618 to request key material from the HSM 634. The requesting VM 606 can use key material to encrypt and decrypt traffic from the external encrypted network 646 arriving at network interface 648.

The VMM 602 can implement a security policy 632, within the VMM 602, to determine whether the requesting VM 606 is authorized to perform a key management operation corresponding to key material stored on the HSM 634. The VMM 602 can also implement the security policy 632 to control the key management operations that other VMs running on the VMM 602 (e.g., the privileged VM 604) can perform. The security policy 632 can be a MAC mechanism within the VMM 602. If the VMM 602 determines that the requesting VM 606 is authorized to perform a key management operation corresponding to the key material (e.g., the first key material 636), then the HSM 634 can be notified to execute the corresponding key management operation on behalf of the requesting VM 606. Requests for the same key material from other VMs running on the VMM 602 (e.g., the privileged VM 604) can be denied by the security policy 632. Similarly, requests from the requesting VM 606 for other key material stored on the HSM 634 (e.g., the second key material 638), can be denied by the security policy 632.

Although FIG. 6 shows key material for use with an encrypted external network 646 being stored on a HSM 634, embodiments in accordance with a number of embodiments of the present disclosure are not so limited. For example, key material for use with an encrypted external network 646 can be stored on an external key material repository (e.g., the external key material repository 208 as illustrated in FIG. 2). The system can include a different device (not shown), in addition to the encrypted external network 646, coupled to the host device 600 and configured to perform a key management operation. For example, the different device can be another encrypted external network or an encrypted storage device (e.g., the encrypted storage device 514 illustrated in FIG. 5). Although FIG. 6 only shows the privileged VM 604 and the requesting VM 606, embodiments can include additional VMs running on the VMM 602.

CONCLUSION

The present disclosure includes methods and systems for providing key material management. A number of embodiments can include providing a VMM that can include one or more customized operations to provide access to key management operations. A number of embodiments can also include providing key material management for an external key material repository storing key materials or a hardware device local to a host device storing key materials.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of a number of associated listed items.

It will be understood that, although the terms first, second, etc. may be used herein to describe various elements and that these elements should not be limited by these terms. These terms are only used to distinguish one element from another element. Thus, a first element could be termed a second element without departing from the teachings of the present disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one.

Combination of the above embodiments, and other embodiments not specifically described herein will be apparent to those of skill in the art upon reviewing the above description. The scope of the number of embodiments of the present disclosure includes other applications in which the above structures and methods are used. Therefore, the scope of the number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
 a hardware host device comprising;
 a virtual machine monitor (VMM) running on the hardware host device, comprising:
  a security policy; and
  a key management module running in the VMM and configured to perform key management using the security policy to provide access, by a number of virtual machines (VMs), to key material required to access an encrypted device, wherein access to the key material is provided from the key management module to a repository external to the system via a network interface; and
 wherein the number of VMs are running on the VMM.

2. The system of claim 1, wherein the VMM implements the security policy that controls:
 which of the number of VMs have access to the key material; and
 which of a number of key management operations each of the number of VMs can perform.

3. The system of claim 2, wherein the security policy is implemented via a mandatory access control (MAC) enforcement mechanism within the VMM.

4. The system of claim 2, wherein a secure programming interface is used by the number of VMs to request access to the key material via the VMM and wherein the key management module supports the secure programming interface.

5. The system of claim 2, further comprising a hardware device local to the hardware host device and configured to store the key material.

6. The system of claim 5, wherein the hardware device is a hardware security module (HSM).

7. The system of claim 2, further comprising a key server VM running on the VMM and coupled to an external key material repository configured to store the key material.

8. The system of claim 2, wherein the number of VMs is partitioned into a number of different security domains, and wherein the number of key management operations each of the number of VMs can perform is dependent upon a corresponding one of the number of security domains.

9. The system of claim 2, wherein the number of key management operations include:
 supporting key management hypercalls used by the number of VMs to request the key material required to access respective devices coupled to the hardware host device;
 encrypting data;
 decrypting the data;
 retrieving the key material;
 generating a new key material;
 deleting the key material;
 applying a digital signature; and
 verifying the digital signature.

10. A system, comprising:
 a hardware host device;
 a virtual machine monitor (VMM) running on the hardware host device, comprising:
  a security policy including a set of rules that define permission to a number of key management operations and key material; and
  a key management module running in the VMM and configured to perform key management using the security policy to provide access, by a first number of VMs, to the key material required for the first number of VMs to access an encrypted device wherein the key management module supports a secure programming interface and wherein access to the key material is provided from the key management module to a repository external to the system via a network interface;
 the first number of virtual machines (VMs) running on the VMM and corresponding to a first security domain; and
 a device configured to perform a key management operation, wherein the device is coupled to the hardware host device and only accessible to the first number of VMs via a number of key materials;

wherein the security policy implemented by the VMM determines whether the first number of VMs may use the secure programming interface to perform the key management operation corresponding to one of the number of key materials corresponding to the device.

11. The system of claim 10, further comprising a key service VM running on the VMM and configured to retrieve, from an external key material repository and in response to the secure programing interface, the one of the number of key materials corresponding to the device.

12. The system of claim 11, wherein the external key material repository is a key material server external to the hardware host device.

13. The system of claim 12, wherein the key material server employs a key management interoperability protocol (KMIP).

14. The system of claim 10, further comprising a hardware security module (HSM) coupled to the hardware host device and configured to store the one of the number of key materials corresponding to the device, wherein the HSM is accessible by the first number of VMs using the secure programming interface.

15. The system of claim 10, further comprising:
a second number of VMs running on the VMM and corresponding to a second security domain, wherein the second security domain is different than the first security domain; and
a different device configured to perform the key management operation coupled to the hardware host device and only accessible to the second number of VMs via the key material;
wherein the security policy implemented by the VMM determines whether the second number of VMs may use the secure programming interface to perform the key management operation corresponding to a different one of the number of key materials corresponding to the device.

16. The system of claim 10, wherein the device is an encrypted storage drive or an encrypted external network.

17. A method for key material management, comprising:
requesting, through a virtual machine monitor (VMM) running on a host device and via a requesting virtual machine (VM), access to key material, wherein the VM requires the key material to decrypt data stored to an encrypted storage device coupled to the host device;
checking a security policy using a key management module to determine whether the requesting VM is approved for accessing the key material, wherein the key management module supports a secure programming interface and wherein the security policy and the key management module are implemented in the VMM;
allowing the request from the requesting VM via the secure programming interface to a key material repository external to the host device to obtain the key material in response to a determination that the requesting VM is approved for access to the key material; and
denying the request in response a determination that the requesting VM is not approved for access to the key material.

18. The method of claim 17, wherein checking the security policy defines access based on which of a number of security domains the requesting VM belongs.

19. The method of claim 17, wherein the method includes determining whether the requesting VM is approved for accessing the key material without routing the request through a privileged VM running on the VMM.

* * * * *